(12) United States Patent
Aoki et al.

(10) Patent No.: US 12,367,307 B2
(45) Date of Patent: *Jul. 22, 2025

(54) RESOURCE MANAGEMENT DEVICE, RESOURCE MANAGEMENTMETHOD, AND RESOURCE MANAGEMENT PROGRAM

(71) Applicant: Nippon Telegraph and Telephone Corporation, Tokyo (JP)

(72) Inventors: Daisuke Aoki, Musashino (JP); Katsuyuki Hasebe, Musashino (JP); Makoto Kanzaki, Musashino (JP); Yusuke Kusakabe, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 314 days.

This patent is subject to a terminal disclaimer.

(21) Appl. No.: 17/914,078

(22) PCT Filed: Mar. 27, 2020

(86) PCT No.: PCT/JP2020/014208
§ 371 (c)(1),
(2) Date: Sep. 23, 2022

(87) PCT Pub. No.: WO2021/192266
PCT Pub. Date: Sep. 30, 2021

(65) Prior Publication Data
US 2023/0123212 A1 Apr. 20, 2023

(51) Int. Cl.
*G06F 21/62* (2013.01)
(52) U.S. Cl.
CPC .............. *G06F 21/6218* (2013.01)

(58) Field of Classification Search
CPC ....................................... G06F 21/6218
See application file for complete search history.

(56) References Cited

U.S. PATENT DOCUMENTS

| 2013/0232480 | A1 | 9/2013 | Winterfeldt et al. |
| 2014/0052773 | A1 | 2/2014 | Deng et al. |
| 2015/0149634 | A1* | 5/2015 | Nassaur .............. G06F 9/5072 709/226 |
| 2020/0110638 | A1* | 4/2020 | Asthana ............... H04L 67/51 |

FOREIGN PATENT DOCUMENTS

JP 2018-032897 3/2018

OTHER PUBLICATIONS

Yoshida et al., "Service Oriented Platform," Fujistu Sci. Tech. J., May 2010, 61(3):283-290, 10 pages (with English Translation).

* cited by examiner

*Primary Examiner* — Thaddeus J Plecha
(74) *Attorney, Agent, or Firm* — Fish & Richardson P.C.

(57) ABSTRACT

A resource management device of the present invention includes a selection unit configured to select a plurality of resources capable of exchanging data in accordance with a data model which clearly specifies a relation among resources arranged in respective layers of a multi-layer, a design unit configured to generate a blueprint for designing a system using the selected resources, and an orchestrator unit configured to execute orchestration for the designed system in accordance with the generated blueprint.

8 Claims, 7 Drawing Sheets

Fig. 2
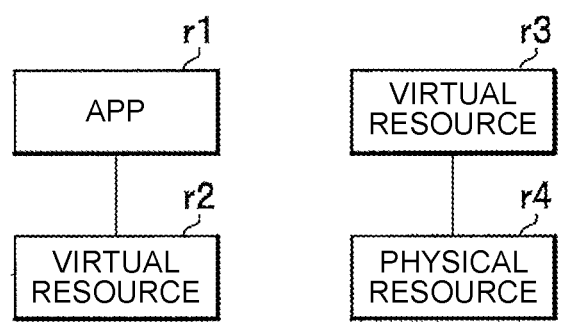
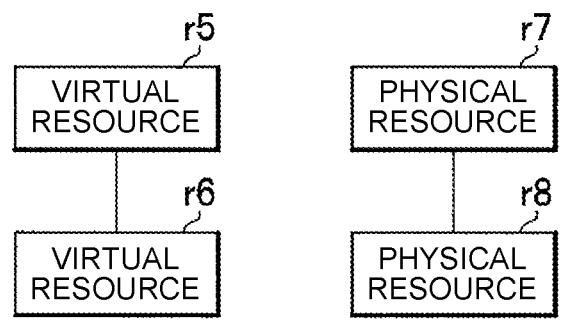

RESOURCE MANAGEMENT DEVICE, RESOURCE MANAGEMENTMETHOD, AND RESOURCE MANAGEMENT PROGRAM

CROSS-REFERENCE TO RELATED APPLICATIONS

This application is a National Stage application under 35 U.S.C. § 371 of International Application No. PCT/JP2020/014208, having an International Filing Date of Mar. 27, 2020, and which application is incorporated herein by reference. To the extent appropriate, a claim of priority is made to the above disclosed application.

TECHNICAL FIELD

The present invention relates to a resource management device, a resource management method, and a resource management program.

BACKGROUND ART

In recent years, techniques for allowing a service provider, such as that of a cloud service, to provide a service to an end user has been actively developed. For example, Patent Literature 1 discloses "an inter-business operator package service construction device that provides a package of one or a plurality of communication services which are released on communication service APIs for each wholesale service provider and which are different from each other, in response to an order request for utilizing a communication service from a terminal which provides communication to a user, the inter-business operator package service construction device including a package construction function unit that retains a catalog describing specifications of communication wholesale services and a coordination rule defining coordination of various kinds of communication services and, in a case where an order request for utilizing a plurality of communication services is made from the terminal, constructs a coordination service by collectively coordinating the communication service APIs corresponding to the plurality of communication services requested by the order request based on the retained catalog and coordination rule and provides the constructed coordination service to the terminal".

CITATION LIST

Patent Literature

Patent Literature 1: Japanese Patent Laid-Open No. 2018-32897 (claim 1)

SUMMARY OF THE INVENTION

Technical Problems

Further, in recent years, there are a number of services such as a platform as a service (PaaS) and an infrastructure as a service (IaaS) which can be utilized or provided via the Internet, and a technique for a system that provides such a plurality of types of services has been actively developed. A vendor which handles a plurality of types of services has unique domains (multi-domain). In other words, a plurality of types of domains exist, and a system is designed so as to achieve coordination among the domains. Further, a virtualization technology is used to provide a plurality of types of services. Thus, resources within each domain are multi-layered and belong to a physical layer, a virtual layer, an application layer, or the like (multi-layer). The resources are also referred to as information and communication technology (ICT) resources. Further, a system is designed so as to achieve coordination among a plurality of types of services, which achieves interaction among users who utilize different services (multi-service). Note that a multi-domain, a multi-layer, and a multi-service will be collectively referred to as "triple multi" below.

However, typically, owners of resources are different, and thus, the respective resources are individually managed for each domain and for each layer. It is therefore normally impossible to apply operation know-how of a system constituted with certain resources to other resources. This results in making control of resources in triple multi extremely complicated in related art and making design of a system which can support triple multi difficult.

In view of such circumstances, an object of the present invention is to facilitate design change of a system that provides a plurality of types of services.

Means for Solving the Problem

To achieve the above-described object, a resource management device of the present invention includes a selection unit configured to select a plurality of resources capable of exchanging data in accordance with a data model which clearly specifies relation among resources arranged in respective layers of a multi-layer, a design unit configured to generate a blueprint for designing a system using the selected resources, and an orchestrator unit configured to execute orchestration for the designed system in accordance with the generated blueprint.

Advantageous Effects of the Invention

In the present invention, it is possible to facilitate design change of a system that provides a plurality of types of services.

BRIEF DESCRIPTION OF DRAWINGS

FIG. 2 is an explanatory diagram of an example of a data model.

DESCRIPTION OF EMBODIMENTS

An embodiment for implementing the present invention (hereinafter, referred to as "the present embodiment") will be described below with reference to the drawings. In the present embodiment, design of a system which can support triple multi will be described. It is assumed that the multi-layer is constituted with a physical layer, a virtual layer, and an application layer. The virtual layer exists on the physical layer, and the application layer exists on the virtual layer. Resources for providing a plurality of types of services can be arranged in each of the physical layer, the virtual layer and the application layer. The resource to be arranged in the application layer may be referred to as an "application". For explanatory convenience, an application may be abbreviated as an "app". The resource to be arranged in the physical layer may be referred to as a "physical resource". The resource to be arranged in the virtual layer may be referred to as a "virtual resource". The physical resource and the virtual resource may be collectively referred to as an "infrastructure".

[Configuration]

Figure 1:
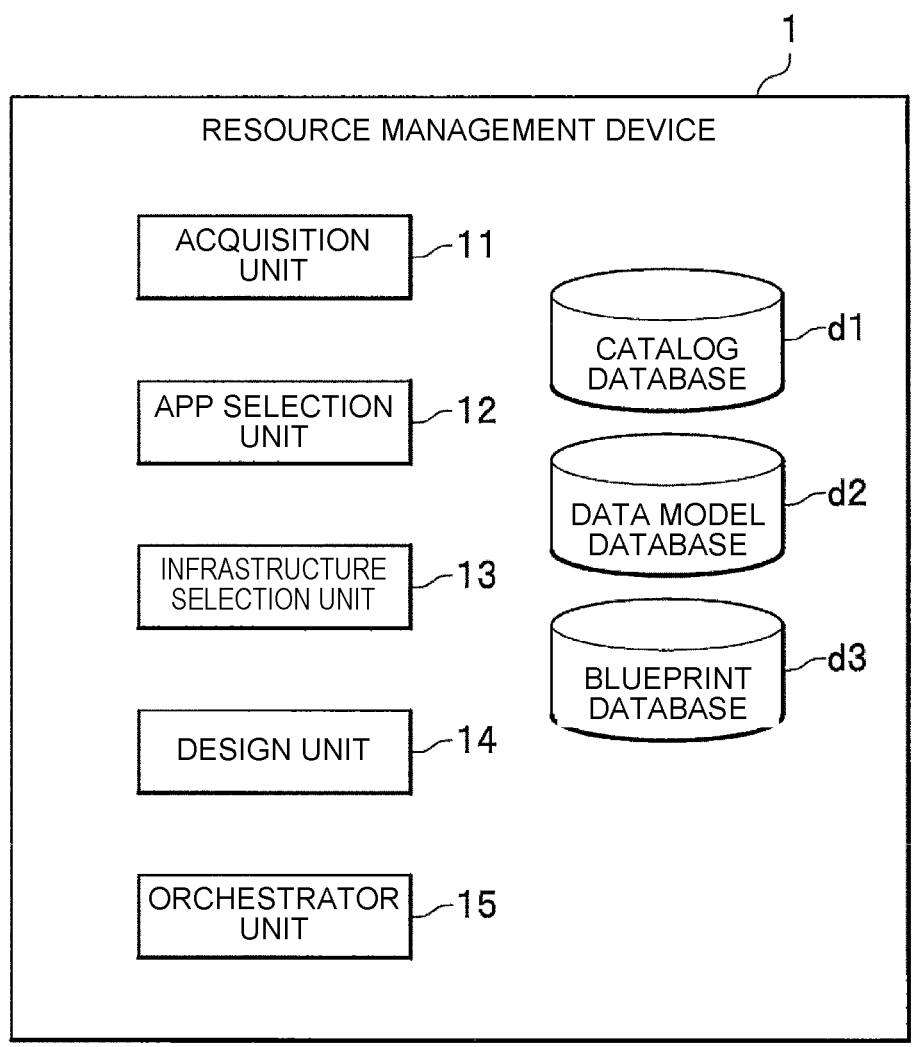
FIG. 1 is a functional configuration diagram of a resource management device according to an embodiment of the present invention.

A resource management device of the present embodiment is a device that manages resources for providing a plurality of types of services. As illustrated in FIG. 1, a resource management device 1 according to the present embodiment includes an acquisition unit 11, an app selection unit 12, an infrastructure selection unit 13, a design unit 14, and an orchestrator unit 15. Further, the resource management device 1 stores a catalog database d1, a data model database d2, and a blueprint database d3. Various kinds of information including the catalog database d1, the data model database d2, and the blueprint database d3 are stored in a storage unit (not illustrated) provided at the resource management device 1.

The acquisition unit 11 acquires a request from an external device. The external device includes, but not limited to, for example, a device such as an information terminal to be used by a user who utilizes a service and a console to be used by an operator who manages a network. The request includes, but not limited to, a request which, for example, requires design, construction and change of a system and which, for example, expresses a request on business. A form of the request can include, but not limited to, for example, text, speech and a command. Further, an external information source can be used as the external device, and the acquisition unit 11 can acquire external information from the external information source. The external information includes, but not limited to, for example, an alert occurring on a network by monitoring a system, a log of a system on a network, information posted on a social networking service (SNS) and information regarding weather and traffic. The request may be equated with the external information as a trigger of processing to be performed in the present embodiment, and the request is not distinguished from the external information unless the circumstances are exceptional in the present embodiment.

The app selection unit 12 selects apps for satisfying the request acquired by the acquisition unit 11. The app selection unit 12 can select apps by analyzing the request and extracting a predetermined catalog from the catalog database d1 based on the analysis result. A technique for analyzing a request itself is well known, and thus, detailed description will be omitted. A catalog is a form of process required for providing a service, and one or a plurality of apps required for providing the service are designated. The catalog itself is well known, and thus, detailed description will be omitted.

Further, the app selection unit 12 can set a data pipeline to be utilized by the selected apps. The data pipeline is a path of data from a data transmission source (for example, an infrastructure) to a data transmission destination (for example, an infrastructure). The app selection unit 12 can set the data pipeline through well-known pipeline processing. For example, the data pipeline can include, but not limited to, a pipeline which has predetermined data processing order by a software pipeline which is one of the pipeline processing.

The infrastructure selection unit 13 selects infrastructures for the apps selected by the app selection unit 12. The infrastructure selection unit 13 can select infrastructures having relation with the selected apps using a specific data model with reference to the data model database d2. Details of the data model will be described later.

The design unit 14 designs a system using the apps selected by the app selection unit 12 and the infrastructures selected by the infrastructure selection unit 13. Specifically, the design unit 14 generates a blueprint. The blueprint is design information of a system including resources which satisfy the request. The blueprint itself is well known, and thus, detailed description will be omitted. Further, the design unit 14 can set parameters for generating the blueprint. The parameters include, but not limited to, for example, the number of users who utilize a service, an IP address of physical machine arranged in the physical layer, an IP address of virtual machine arranged in the virtual layer, or the like. The parameter itself is well known, and thus, detailed description will be omitted.

The orchestrator unit 15 executes orchestration for the system designed by the design unit 14 in accordance with the blueprint generated by the design unit 14. The orchestration is automatic control of deployment, setting and management of the service. The service is provided by the orchestration. Further, the orchestrator unit 15 can execute a test of the system.

The catalog database d1 is an aggregate of catalogs. The data model database d2 is an aggregate of data models. The blueprint database d3 is an aggregate of blueprints. The blueprint generated by the design unit 14 is accumulated in the blueprint database d3.

<Details of Data Model>

The data model in the present embodiment clearly specifies relation among resources which exchange predetermined data. The data model is expressed with a set of relation and two resources having the relation. Note that a data model originally determines a structure of data or structured data in an explicit manner. However, in the present invention, the data model is specifically used. In other words, the data model is defined as indicating individual resources provided in a service, or the like, and relation among the resources and can be utilized as a reference for design of a complex system in which a plurality of services are combined. Thus, a group of resources necessary for providing a plurality of services is specified.

In the present embodiment, the resources are classified into an app arranged in the app layer, a virtual resource arranged in the virtual layer, and a physical resource arranged in the physical layer. Thus, as illustrated in FIG. 2, the data model includes a data model in which relation is formed between an app r1 and a virtual resource r2, and a data model in which relation is formed between a virtual resource r3 and a physical resource r4. These two data models are examples where relation is formed between resources arranged in adjacent layers. Further, as illustrated in FIG. 2, the data model includes a data model in which relation is formed between virtual resources r5 and r6 and a data model in which relation is formed between physical resources r7 and r8. These two data models are examples where relation is formed between resources arranged in the same layer. Note that the data model may include a data model in which relation is formed between two apps.

The data model enables exchange of predetermined data between specified two resources, that is, defines formation of data flow. Thus, in a case where the app selection unit 12 selects apps, the infrastructure selection unit 13 can select virtual resources having relation with the selected apps in accordance with the data model, so that data is exchanged. Further, the infrastructure selection unit 13 can select physical resources or other virtual resources having relation with the selected virtual resources in accordance with the data model, so that data is exchanged. Still further, the infrastructure selection unit 13 can select other physical resources or virtual resources having relation with the selected physical resources in accordance with the data model, so that data is exchanged.

The apps and the virtual resources are updated or upgraded as appropriate in accordance with, for example, change of types of resources to be utilized for providing a predetermined service, change of a way to use the resources (a usage mode of the user), or the like. Further, the physical resources are provided as, for example, equipment which follows new standards as appropriate. Specifically, reduction in granularity of a management unit such as switch of management from management by a server to management by a processing device or a memory which constitutes the server, replacement of worn out equipment with new equipment having reinforced performance, replacement of equipment with equipment having a changed data structure, or the like, is performed. In this manner, the resources dynamically change. Thus, the data model also dynamically changes (is updated). The data model database d2 is updated as appropriate in accordance with such change.

Note that as illustrated in FIG. 2, while the data model is prepared as a data model having relation between two resources, there may be a plurality of data models which have common one resource out of the two resources having relation and have different resources as the other of the two resources. In this case, there may be a plurality of infrastructures having relation with the apps selected by the app selection unit 12 depending on the data model. The infrastructure selection unit 13 can select one infrastructure using predetermined priority order (for example, service level agreement (SLA), link cost and other policies).

Further, owners who own the resources exist for each of the resources. The resource management device 1 can manage the resources in association with the owners of the resources. Further, users having authority of the resources are determined for each of the resources to be managed by the resource management device 1. The resource management device 1 can manage the resources in association with the users having authority of the resources.

Further, regarding a network on which a service is to be provided, tenants are prepared in unit of a virtual network to be provided to specific users (for example, one customer, one company). One tenant can be prepared for one or a plurality of types of services. Thus, one tenant can be allocated to a plurality of resources which comply with a predetermined rule. As a result, the resource management device 1 can manage the resources in association with tenants to which the resources belong.

Use of the data model enables the infrastructure selection unit 13 to select infrastructures capable of exchanging data (data flow) only with reference to relation between the resources (apps, infrastructures). In other words, infrastructures can be selected for the selected apps regardless of which layers of a multi-layer, resources which handle a data flow belong to. Further, infrastructures can be selected for the selected apps regardless of which services of a multi-service, are to be provided by resources which handle a data flow.

Further, a domain in design of a system which can support triple multi relates to the owner of the resource and the tenant described above. In other words, the owner of the resource within the domain can be specified in accordance with the domain, or a tenant which can be equated with the domain can be prepared. However, as described above, the infrastructures for the specific apps are selected by using the data model, so that the infrastructures can be selected for the selected apps regardless of which domains of a multi-domain the resources which handle the data flow belong to.

In this manner, the data model, which can take a versatile data structure by abstracting a difference between respective domains, a difference between respective layers and a difference between respective services, is useful means for optimizing the resources selected for the request.

[Processing]

Design processing to be performed by the resource management device 1 to design of a system that provides a plurality of types of services will be described with reference to FIG. 3.

First, the acquisition unit 11 acquires a request from the external device (step S1). Then, the app selection unit 12 analyzes the acquired request and selects apps for satisfying the request (step S2). Then, the infrastructure selection unit 13 selects infrastructures having relation with the selected apps or infrastructures having relation with the selected infrastructures in accordance with the data model (step S3). Then, the design unit 14 sets parameters for the apps selected by the app selection unit 12 and the infrastructures selected by the infrastructure selection unit 13 (step S4). Then, the design unit 14 generates a blueprint for designing a system using the apps selected by the app selection unit 12, the infrastructures selected by the infrastructure selection unit 13 and the set parameters (step S5). Finally, the orchestrator unit 15 executes orchestration for the system in accordance with the generated blueprint (step S6).

Figure 3:
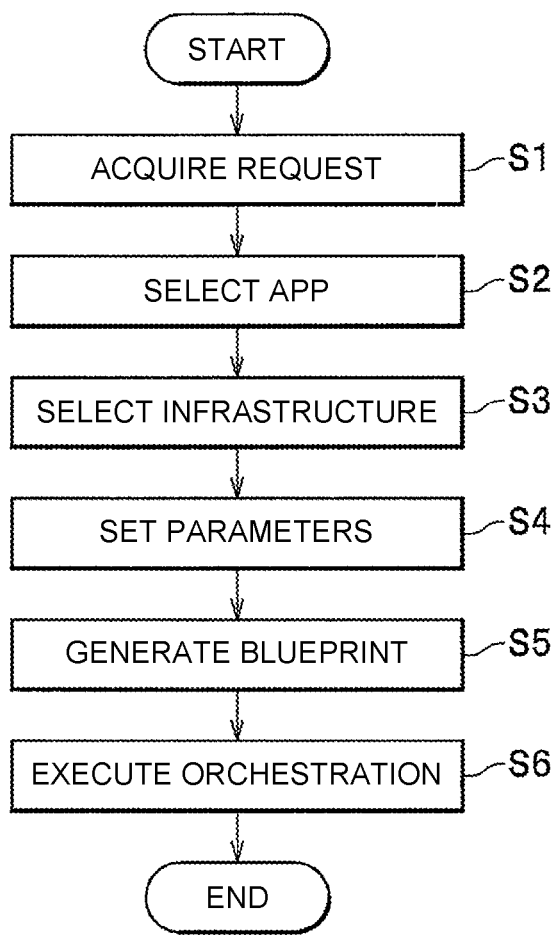
FIG. 3 is a flowchart of design processing.

According to the design processing described in FIG. 3, it is possible to implement provision of service by the designed system. Note that the orchestrator unit 15 may execute a test of the designed system.

Note that there is a case where a blueprint can be generated without parameters being set depending on the selected apps or infrastructures, which means that parameters are not essential. Thus, processing in step S4 is arbitrary.

Further, the design unit 14 can accumulate the generated blueprint in the blueprint database d3. Still further, the design unit 14 can form new relation with the apps and the infrastructures used in the designed system and can generate a new data model. The design unit 14 can accumulate the newly generated data model in the data model database d2.

Specific Example

Figure 4:
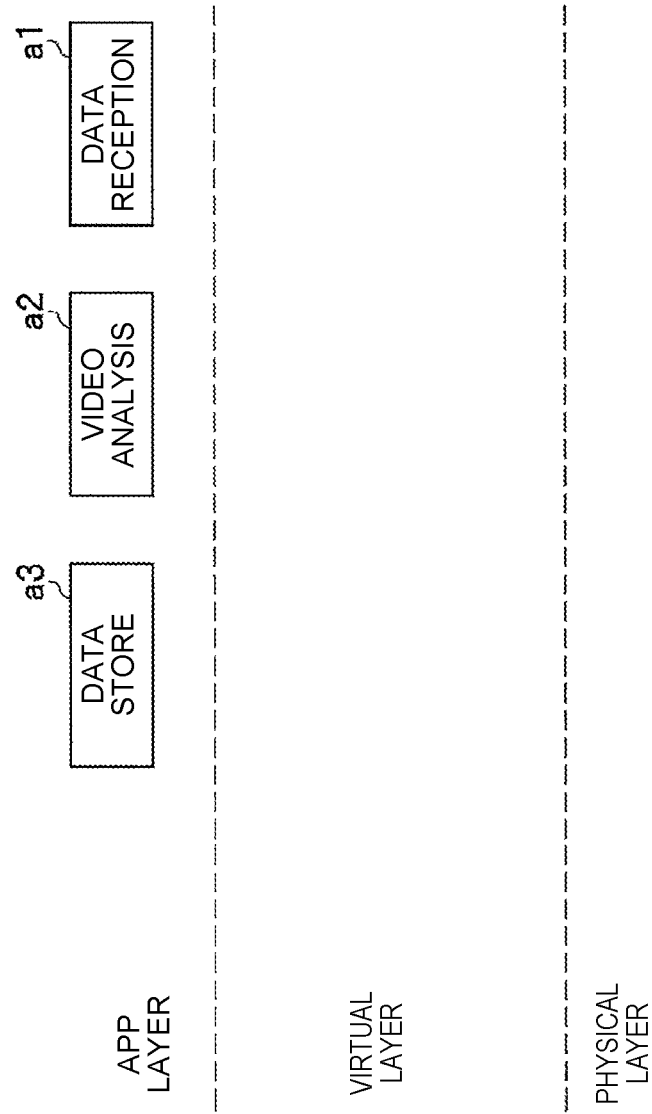
FIG. 4 is a specific example (1/3) of design of a system.

As a specific example, design of a system in a case where a request for "detecting a suspicious person from a video input via the Internet" is made will be described. As illustrated in FIG. 4, after the acquisition unit 11 acquires a request, the app selection unit 12 analyzes the request and can select apps of data reception a1, video analysis a2 and data store a3 (see step S2 in FIG. 3). Data reception a1, video analysis a2 and data store a3 are arranged in the app layer.

Figure 5:
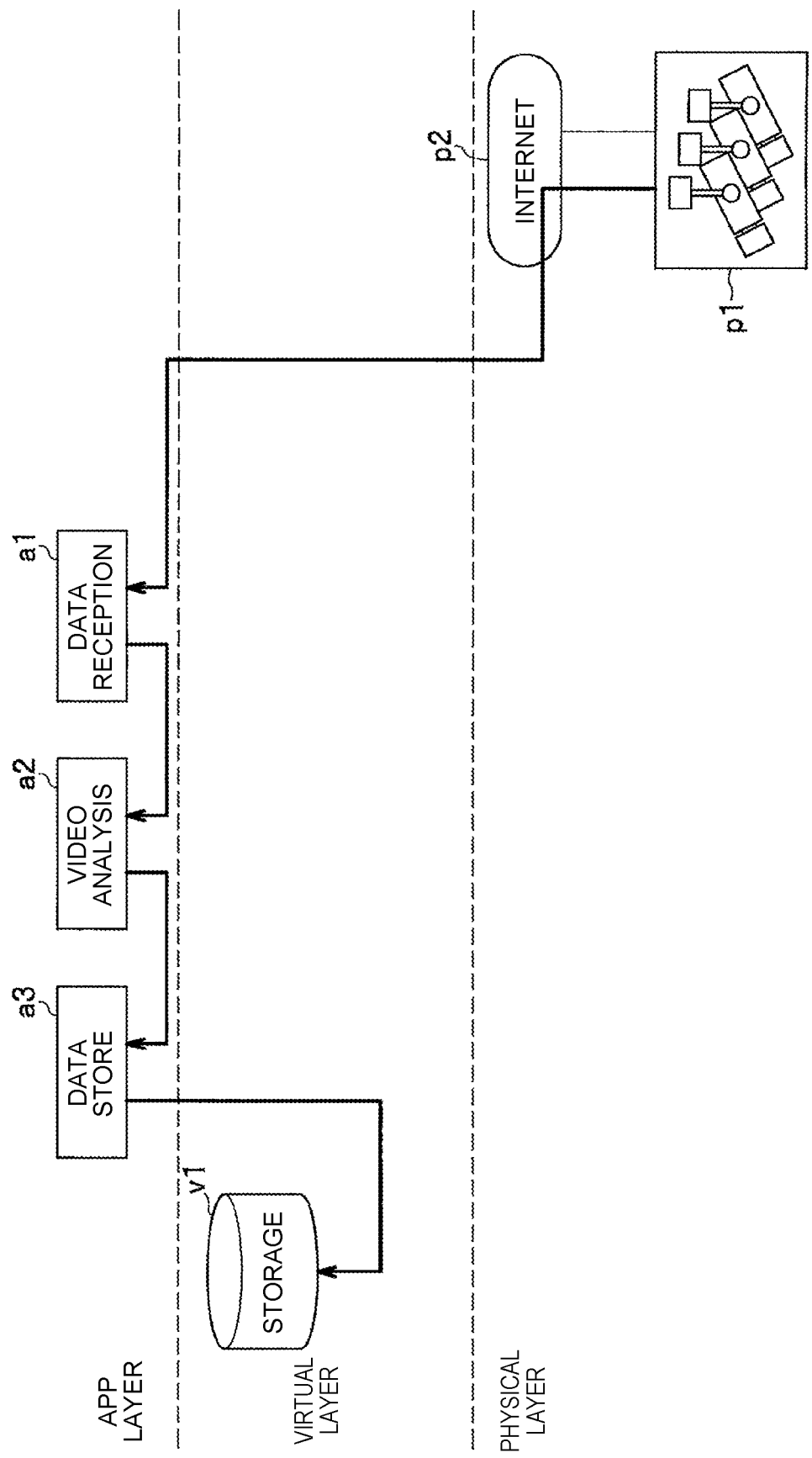
FIG. 5 is a specific example (2/3) of design of the system.

Then, as illustrated in FIG. 5, the app selection unit 12 sets a data pipeline (solid line with an arrow) to be utilized by the selected apps (data reception a1, video analysis a2 and data store a3). The data pipeline depends on the apps selected by the app selection unit 12, and thus, for example, the app selection unit 12 may set the data pipeline, but a component which sets the data pipeline is not limited to this. For example, the design unit 14 may set the data pipeline. Note that in a case where a plurality of types of data pipelines can be set for the selected apps, one data pipeline can be set in accordance with selection of the infrastructures by the infrastructure selection unit 13.

In the present specific example, the infrastructure selection unit 13 can select a security camera p1 as a data transmission source based on content of the request. Further, the infrastructure selection unit 13 can select the Internet p2 as a network to be used by the security camera p1 to transmit data based on the content of the request and the app selection result. Further, the infrastructure selection unit 13 can select a storage v1 as a data transmission destination based on the content of the request and the app selection result. The security camera p1 and the Internet p2 are resources arranged in the physical layer. The storage v1 is a resource arranged in the virtual layer. The app selection unit 12 can set a data pipeline from the security camera p1 to the storage v1 by way of the selected apps (data reception a1, video analysis a2 and data store a3). Note that in a case where a data pipeline is set, it is preferable to retain a best practice among the apps.

Figure 6:
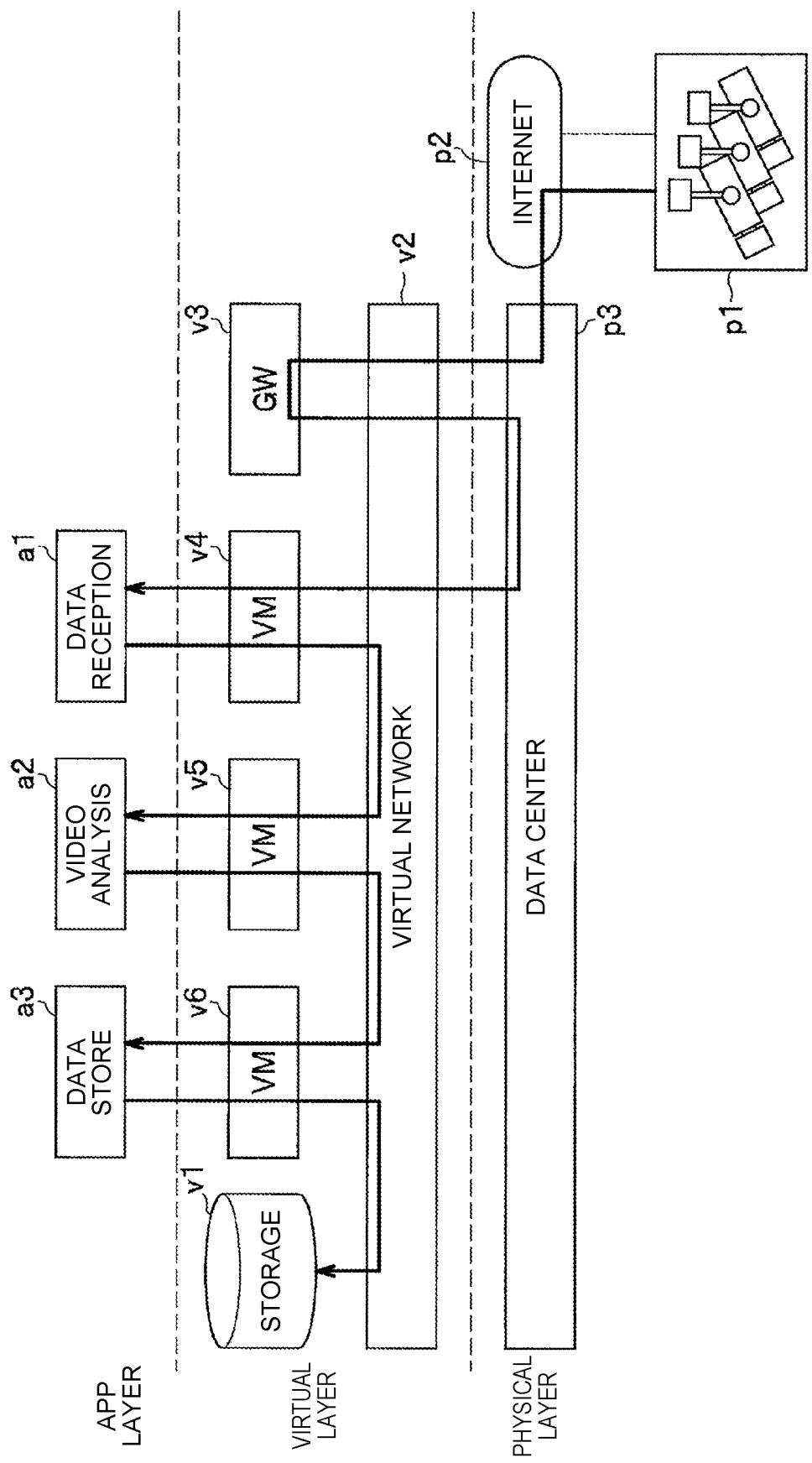
FIG. 6 is a specific example (3/3) of design of the system.

Then, as illustrated in FIG. 6, the infrastructure selection unit 13 selects infrastructures (see step S3 in FIG. 3). The infrastructure selection unit 13 can select a data center p3, a virtual network v2, a gateway (GW) v3 and virtual machine (VM) v4 to v6 in accordance with the data pipeline and the data model. The data center p3 is a resource arranged in the physical layer. The virtual network v2, the gateway (GW) v3 and the virtual machine (VM) v4 to v6 are resources arranged in the virtual layer. As a result, as illustrated in FIG. 6, a data pipeline which passes through the selected infrastructures is set (solid line with an arrow).

In a case where the selected apps (data reception a1, video analysis a2 and data store a3) have predetermined operating conditions, the infrastructure selection unit 13 preferably selects infrastructures which can fulfill the operating conditions. The "predetermined operating conditions" can be, for example, a condition that the infrastructure has a sufficient resource amount (resource check), but the predetermined operating conditions are not limited to this. In a case where there is an infrastructure whose resource amount is insufficient, the resource management device 1 can notify an owner of the infrastructure that the resource amount is insufficient. A resource having relation with the app by the data model can be regarded as a resource which can fulfill the operating conditions of the app. In a case where infrastructures are selected, it is preferable to retain a best practice of the resources including the infrastructures and the apps.

Thereafter, the design unit 14 sets parameters and generates a blueprint (see step S4 to step S5 in FIG. 3), and the orchestrator unit 15 executes orchestration (see step S6 in FIG. 3). It is therefore possible to design a system in which the security camera p1 can capture an image of a suspicious person as a system including the selected resources and implement a service which satisfies a request.

[Program]

Further, it is possible to cause a computer to execute functions of the resource management device 1 according to the above-described embodiment by a program. In this case, effects similar to the effects of the above-described embodiment can be obtained by the computer executing the program. Further, it is also possible to implement processing similar to the processing in the above-described embodiment by recording the program in a computer readable recording medium and causing the computer to read and execute the program recorded in this recording medium. An example of the computer which executes a resource management program which implements functions similar to the functions of the resource management device 1 will be described below.

Figure 7:
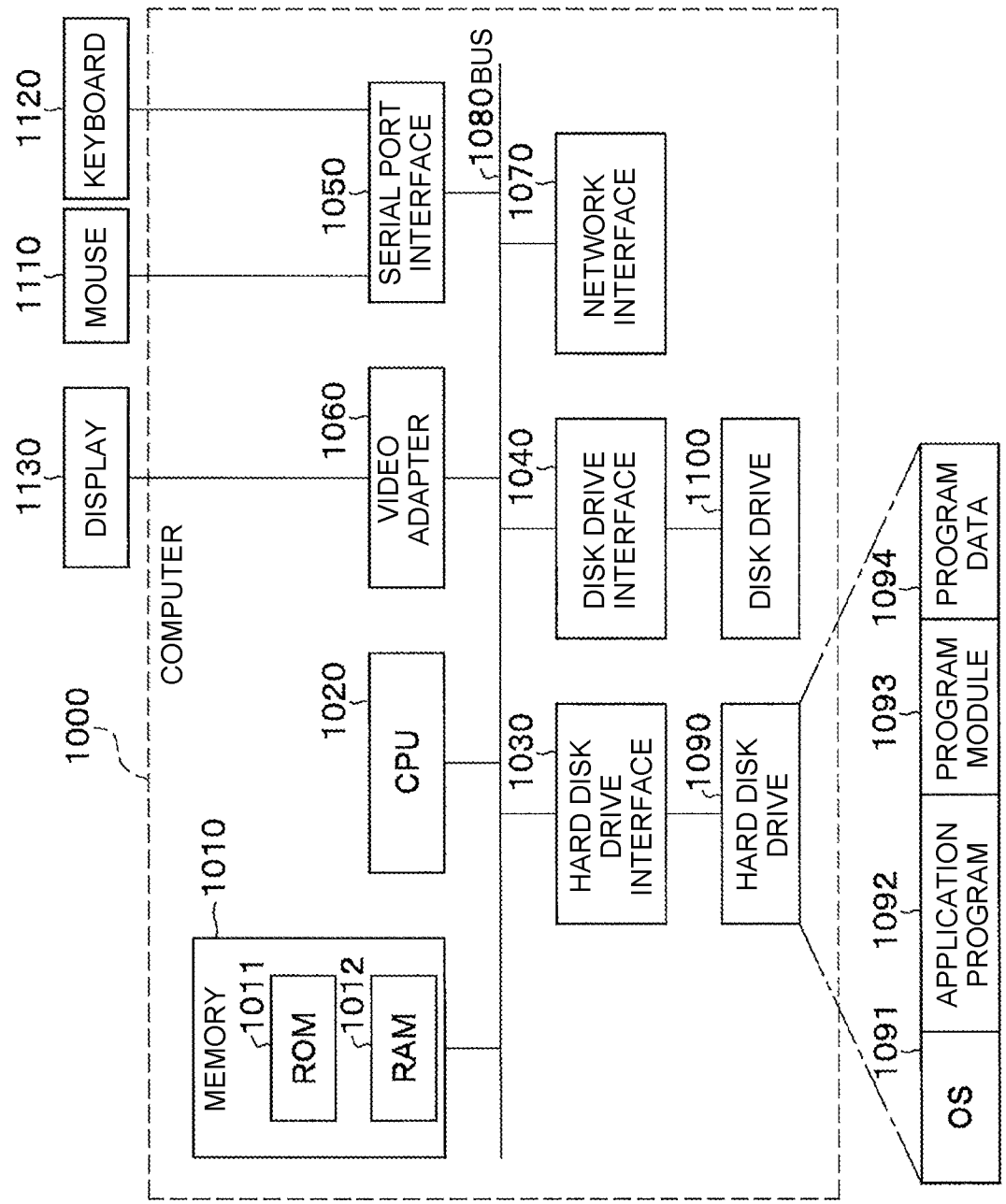
FIG. 7 is a view illustrating a computer which executes a program of processing according to the present embodiment.

FIG. 7 is a view illustrating a computer which executes the resource management program. As illustrated in FIG. 7, a computer 1000 includes, for example, a memory 1010, a CPU 1020, a hard disk drive interface 1030, a disk drive interface 1040, a serial port interface 1050, a video adapter 1060 and a network interface 1070. These components are connected with a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a detachable storage medium such as a magnetic disk and an optical disk is inserted into the disk drive 1100. For example, a mouse 1110 and a keyboard 1120 are connected to the serial port interface 1050. For example, a display 1130 is connected to the video adapter 1060. The memory 1010, the hard disk drive 1090, the disk drive 1100, and the storage medium to be inserted into the disk drive 1100 become specific hardware resources of the storage unit provided at the resource management device 1.

Here, as illustrated in FIG. 7, the hard disk drive 1090, for example, stores an OS 1091, an application program 1092, a program module 1093 and program data 1094. The respective tables described in the above-described embodiment are stored in, for example, the hard disk drive 1090 and the memory 1010.

Further, the resource management program is stored in the hard disk drive 1090 as, for example, a program module which describes a command to be executed by the computer 1000. Specifically, a program module which describes respective kinds of processing to be executed by the resource management device 1 described in the above-described embodiment is stored in the hard disk drive 1090.

Further, data to be used in information processing by the resource management program is stored in, for example, the hard disk drive 1090 as the program data. Then, the CPU 1020 reads out the program module 1093 and the program data 1094 stored in the hard disk drive 1090 to the RAM 1012 as necessary and executes the above-described procedure.

Note that the program module 1093 and the program data 1094 relating to the resource management program may be stored in, for example, a detachable storage medium and may be read out by the CPU 1020 via the disk drive 1100, or the like, as well as being stored in the hard disk drive 1090. Alternatively, the program module 1093 and the program data 1094 according to the resource management program may be stored in other computers connected via a network such as a local area network (LAN) and a wide area network (WAN) and may be read out by the CPU 1020 via the network interface 1070.

[Effects]

As described above, the present embodiment is a resource management device including the selection unit (the app selection unit 12, the infrastructure selection unit 13) configured to select a plurality of resources capable of exchanging data in accordance with a data model which clearly specifies relation among resources arranged in respective layers of a multi-layer, the design unit 14 configured to generate a blueprint for designing a system using the selected resources, and the orchestrator unit 15 configured to execute orchestration for the designed system in accordance with the generated blueprint.

Further, the present embodiment is a resource management method to be executed by the resource management device 1, the resource management method including a step of selecting a plurality of resources capable of exchanging data in accordance with a data model which clearly specifies relation among resources arranged in respective layers of a multi-layer, a step of generating a blueprint for designing a system using the selected resources, and a step of executing orchestration for the designed system in accordance with the generated blueprint.

According to these, the present embodiment can set a data pipeline for providing a plurality of types of services. Thus, the present embodiment can facilitate design of a system that provides a plurality of types of services.

Further, the plurality of resources include an app for satisfying a request and an infrastructure having relation with the app.

This enables the present embodiment to set a data pipeline in accordance with the apps selected in accordance with a request.

The data model is utilized as a reference when a plurality of services are combined and is updated in accordance with a dynamic change of the resources.

This enables the present embodiment to facilitate design of a system which dynamically changes in a service which is a combination of a plurality of services.

Modified Examples

Various kinds of techniques described in the present embodiment can be combined as appropriate.

REFERENCE SIGNS LIST

1 Resource management device
11 Acquisition unit
12 App selection unit (selection unit)
13 Infrastructure selection unit (selection unit)
14 Design unit
15 Orchestrator unit
d1 Catalog database
d2 Data model database
d3 Blueprint database

The invention claimed is:

1. A resource management device comprising:
   a data model database storing a plurality of data models each specifying a relationship between two resources capable of exchanging data, each of the two resources belonging to a physical layer, a virtual layer, or an application layer;
   a selection unit, including one or more processors, configured to
      select an application for satisfying a request received from an external device; and
      select a plurality of resources based on the data model database such that the plurality of resources includes a resource having a relationship with the application to exchange data according to a corresponding one of the plurality of data models;
   a design unit, including one or more processors, configured to generate a blueprint for designing a system using the selected plurality of resources; and
   an orchestrator unit, including one or more processors, configured to execute orchestration for the designed system in accordance with the generated blueprint.

2. The resource management device according to claim 1, wherein each of the plurality of data models is utilized as a reference when a plurality of services are combined and is updated in accordance with a dynamic change of resources whose relationship regarding data exchange is specified by the data model.

3. The resource management device according to claim 1, wherein the selection unit is further configured to:
   set a data pipeline from a data transmission source to a data transmission destination of data to be used by the application; and
   select the plurality of resources based on the data model database so that data can be exchanged through the data pipeline.

4. A resource management method of a resource management device, the resource management device comprising a data model database storing a plurality of data models each specifying a relationship between two resources capable of exchanging data, each of the two resources belonging to a physical layer, a virtual layer, or an application layer, the resource management method comprising steps of, by the resource management device:
   selecting an application for satisfying a request;
   selecting a plurality of resources based on the data model database such that the plurality of resources includes a resource having a relationship with the application according to a corresponding one of the plurality of data models;
   a step of generating a blueprint for designing a system using the selected plurality of resources; and
   a step of executing orchestration for the designed system in accordance with the generated blueprint.

5. The resource management method according to claim 4, wherein each of the plurality of data models is utilized as a reference when a plurality of services are combined and is updated in accordance with a dynamic change of resources whose relationship regarding data exchange is specified by the data model.

6. A non-transitory computer readable medium with a resource management program for causing a computer to execute the resource management method according to claim 4.

7. A non-transitory computer readable medium with a resource management program for causing a computer to execute the resource management method according to claim 5.

8. The resource management method according to claim 4, further comprising steps of, by the resource management device:
   setting a data pipeline from a data transmission source to a data transmission destination of data to be used by the application,
   wherein the step of selecting the plurality of resources is performed so that data can be exchanged through the data pipeline.

* * * * *